(12) United States Patent
Kobayashi et al.

(10) Patent No.: US 7,615,961 B2
(45) Date of Patent: Nov. 10, 2009

(54) CONTROL DEVICE FOR STEPPING MOTOR

(75) Inventors: Hidenori Kobayashi, Sunto-gun (JP); Shunichi Ono, Izu (JP); Kazumasa Takada, Numazu (JP); Takashi Okano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 240 days.

(21) Appl. No.: 11/743,231

(22) Filed: May 2, 2007

(65) Prior Publication Data

US 2008/0012523 A1    Jan. 17, 2008

(30) Foreign Application Priority Data

May 11, 2006    (JP) ............................. 2006-132433

(51) Int. Cl.
*G05B 19/40* (2006.01)
(52) U.S. Cl. .................. 318/685; 318/696; 318/567; 318/568.1
(58) Field of Classification Search ............... 318/696, 318/685, 567, 568.1; 399/76, 77, 83, 167
See application file for complete search history.

(56) References Cited

U.S. PATENT DOCUMENTS

| 6,184,646 | B1* | 2/2001 | Yagoshi et al. ............ 318/696 |
| 6,911,800 | B2* | 6/2005 | Kobayashi et al. ......... 318/685 |
| 6,915,357 | B2* | 7/2005 | Kawase ..................... 710/25 |
| 6,975,053 | B2* | 12/2005 | Tsujimoto .................. 310/103 |
| 7,304,449 | B2* | 12/2007 | Yoshihisa ................... 318/685 |
| 7,330,009 | B2* | 2/2008 | Andoh et al. ............... 318/696 |
| 2004/0113581 | A1* | 6/2004 | Kobayashi et al. ......... 318/685 |

FOREIGN PATENT DOCUMENTS

| JP | 07-311607 | 11/1995 |
| JP | 08-168295 | 6/1996 |
| JP | 11-202913 | 7/1999 |
| JP | 2001-359292 | 12/2001 |
| JP | 2002-268471 | 9/2002 |

* cited by examiner

*Primary Examiner*—Bentsu Ro
*Assistant Examiner*—Thai Dinh
(74) *Attorney, Agent, or Firm*—Turocy & Watson, LLP

(57) ABSTRACT

A control device for a stepping motor of the present invention stores setting data for controlling a state of the stepping motor in a data storage unit for each of a plurality of basic control items obtained by classifying control from activation to stoppage of the stepping motor. In addition, the control device for the stepping motor includes a plurality of modules that execute processing with respect to the basic control items and a module control unit that specifies the order of executing the processing by the plurality of modules in advance, and controls the stepping motor by operating the modules in accordance with the specified executing order based on the setting data stored in the data storage unit.

20 Claims, 5 Drawing Sheets

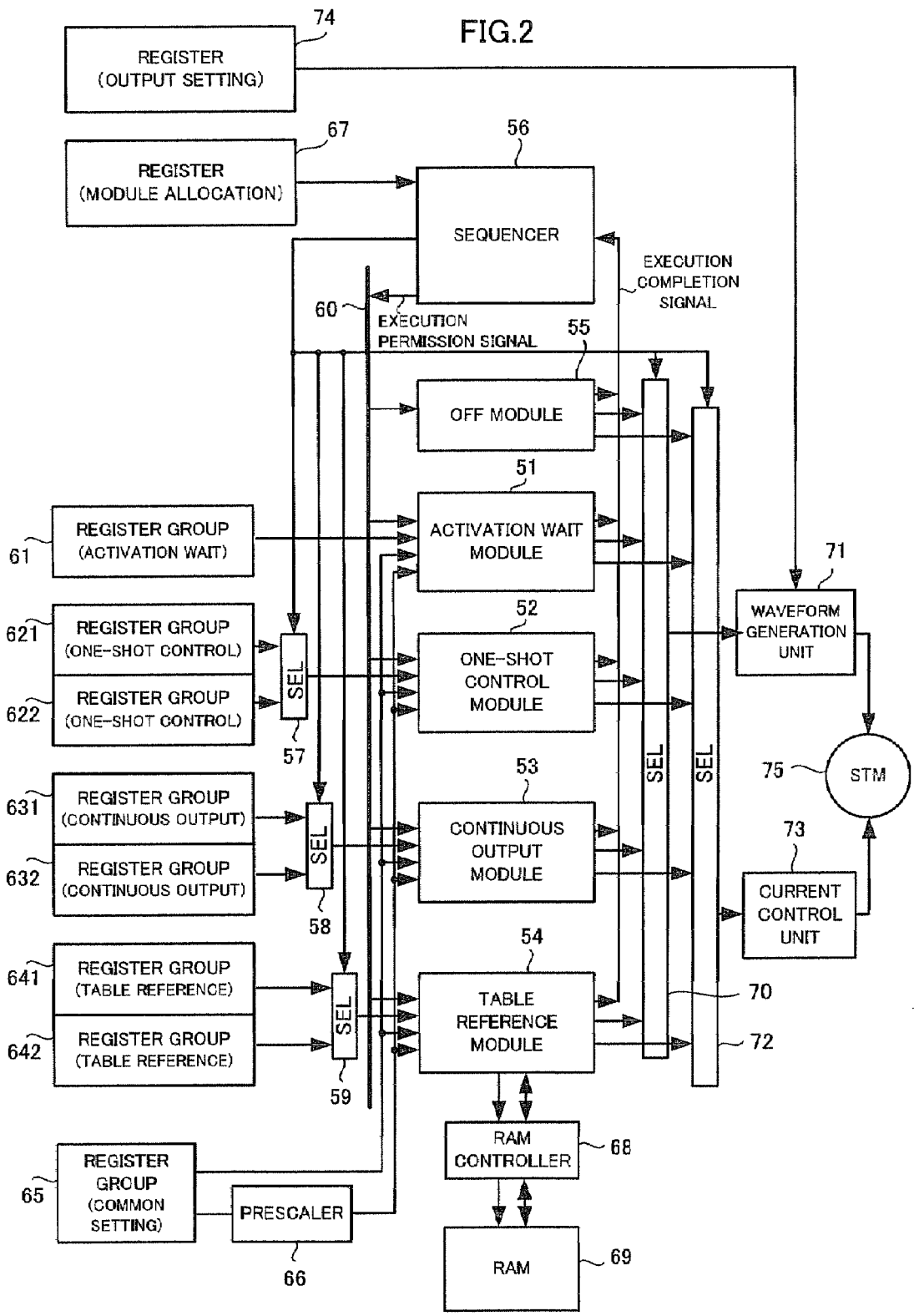

CONTROL DEVICE FOR STEPPING MOTOR

CROSS-REFERENCE TO RELATED APPLICATION

This application is based upon and claims the benefit of priority from the prior Japanese Patent Application No. 2006-132433, filed on May 11, 2006, the entire contents of which are incorporated herein by reference.

BACKGROUND OF THE INVENTION

1. Field of the Invention

The present invention relates to a control device for a stepping motor and an image forming device using a stepping motor. Further, the present invention relates to a sequence control device.

2. Description of the Related Art

In general, a stepping motor is used to control rotation of a photoconductive drum and a transfer belt in an image forming device such as an MFP, a copier, and a printer. The stepping motor is a motor which is driven by supplying a predetermined excitation pattern to a driver. The stepping motor can be rotationally controlled for a step angle corresponding to the supplied excitation pattern, and is used in a wide variety of fields. As the excitation pattern, there are patterns such as 1 phase excitation, 2 phase excitation, and 1-2 phase excitation.

A control device for the stepping motor includes a timer and a clock signal is generated based on a reference timing signal generated in the timer. The clock signal is used to prepare the excitation pattern. Therefore, a rotational speed can be controlled by optionally setting a cycle of the timing signal from the timer.

On the other hand, processing of output control of the timer, control of a motor or the like has conventionally been carried out by incorporating a controlling function in a CPU or by using an exclusive IC. For example, when control of the stepping motor is carried out by using the CPU, a variety of types of control are carried during a period between start and stop of drive of the motor. These types of control have been carried out by internal interruption of the CPU and building a program by utilizing DMA (Direct Memory Access).

However, the CPU also carries out control of parts other than the motor. Therefore, the more there are targets to be controlled, the more the processing such as interruption which lowers performance of the CPU. For this reason, the control by the CPU has an upper limit in program processing. In order to reduce this restriction, the processing of the CPU needs to be dispersed. In order to achieve this, the above situation is responded by a method such as a plurality of the CPUs are used. When a plurality of the CPUs are used, peripheral devices such as ROM and RAM are necessary for each of the CPUs, and also a communication means for reciprocally reporting a state between the CPUs needs to be included.

Jpn. Pat. Appln. Laid-Open Publication No. 2001-359292 describes a motor control device for controlling traveling of a movable body. This is an example where region information is generated based on positional information and speed information in the traveling of the movable body, and parameters for controlling a motor set for each region are read out from a memory circuit to control the motor. However, the region information needs to be generated for an entire section of the traveling of the movable object, and a circuit configuration is complicated.

In addition, Jpn. Pat. Appln. Laid-Open Publication No. 8-168295 discloses a control method of a stepping motor. In this example, a drive voltage of the stepping motor is changed depending on an operating state to ensure activation and stoppage of the stepping motor.

In addition, Jpn. Pat. Appln. Laid-Open Publication No. 2002-268471 discloses an ASIC incorporating a programmable sequencer and an image forming device. In this example, the ASIC for controlling a power source is included in a copier, a printer, etc. The ASIC controls a change to a power conservation mode and a return sequence from the power conservation mode.

In addition, Jpn. Pat. Appln. Laid-Open Publication No. 7-311607 describes a sequence control method suitable for manufacturing a semiconductor device. In this example, a CPU is provided both on a console side and on a processing device side. Under control of the CPU on the console side, a plurality of operational commands and executing timings of operation are stored in a storage means. The operational commands are read out for each of the executing timing and processing is executed on the processing device side.

Further, Jpn. Pat. Appln. Laid-Open Publication No. 11-202913 discloses a control device of a Programmable Machine Controller. This example is for controlling a target to be controlled in accordance with a sequence program, and for carrying out interruption processing based on a change in a state of the target to be controlled.

The present invention provides a control device for a stepping motor, an image forming device, and a sequence control device, the control device for a stepping motor capable of controlling with a high degree of freedom by classifying basic control such as a stepping motor into a plurality of parts and executing processing sequentially.

BRIEF DESCRIPTION OF THE DRAWINGS

FIG. 2 is a block diagram showing one embodiment of a control device for a stepping motor according to the embodiment of the present invention;

DETAILED DESCRIPTION OF THE INVENTION

Throughout this description, the embodiment and example shown should be considered exemplars, rather than limitations on the apparatus and methods of the present invention.

Hereinafter, an embodiment of the present invention will be described in detail with reference to the accompanying drawings. In each of the drawings, the same parts are marked with the same numerical numbers.

Figure 1:
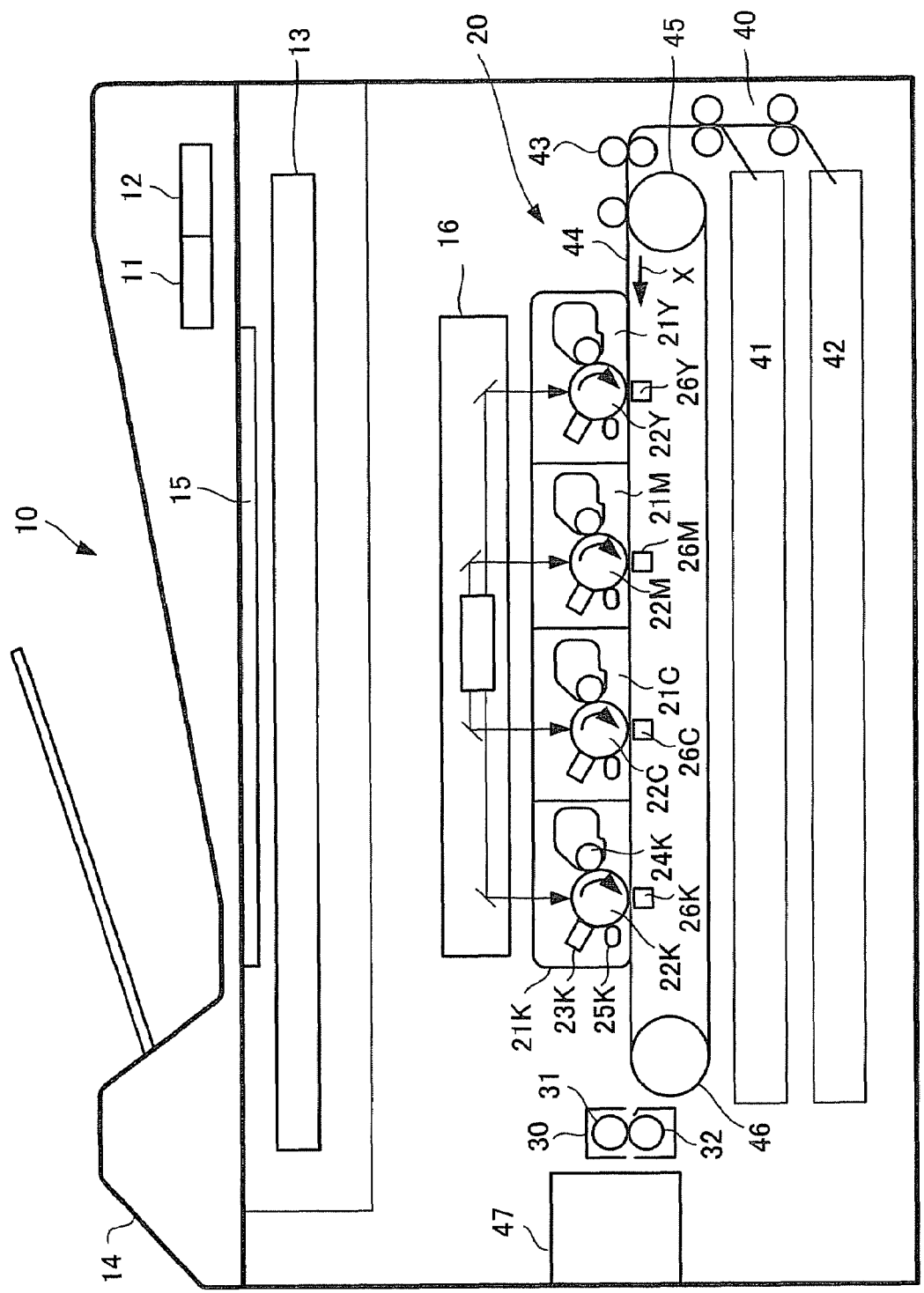
FIG. 1 is a configuration diagram showing an entire configuration of an image forming device according to an embodiment of the present invention.

FIG. 1 is a configuration diagram showing an image forming device according to an embodiment of the present invention. In the following description, an MFP is described as an example. However, the following description is applicable to an image forming device such as a printer, a copier, etc.

In FIG. 1, the numerical number 10 denotes the image forming device. The image forming device 10 has, on an upper part thereof, an operating unit 11, a displaying unit 12, a scanner unit 13, an automatic document feeding device (ADF) 14, a transparent document table 15, and an exposure unit 16.

In addition, the image forming device 10 includes, at a center part thereof, an image forming unit 20. The image forming unit 20 is configured with, for example, a laser printer of an electrophotographic system. The image forming unit 20 forms an image of each color of K (black), C (cyan), M (magenta), and Y (yellow).

The image forming device 20 has four sets of process units 21K, 21C, 21M, and 21Y arranged along a moving direction X of paper. Each of the process units 21K, 21C, 21M, and 21Y has photoconductive drums 22K, 22C, 22M, and 22Y which are image carriers. The photoconductive drums 22K, 22C, 22M, and 22Y are arranged such that a rotational axis thereof is in parallel with a main scanning direction. Also, the photoconductive drums are arranged in a line with intervals of a predetermined pitch in the moving direction X of paper (sub-scanning direction).

In addition, the process units 21K, 21C, 21M, and 21Y can entirely be mounted in and removed from the image forming device 10. Alternatively, the process units 21K, 21C, 21M, and 21Y can individually be mounted in and removed from the image forming device 10.

Each of the process units 21K, 21C, 21M, and 21Y has a configuration similar to the others, therefore the process unit 21K is exemplified and described here. The process unit 21K is configured to include an electric charger 23K, a developing unit 24K, a cleaner 25K arranged around the photoconductive drum 22K. In addition, transfer units 26K, 26C, 26M, and 26Y configured with a corona wire or a roller are provided to face the photoconductive drums 22K, 22C, 22M, and 22Y. The transfer units 26K, 26C, 26M, and 26Y constitute a transfer member.

In addition, the image forming unit 20 has a paper feeding unit 40 on a lower part thereof. The paper feeing unit 40 includes a plurality of paper feeding cassettes 41 and 42 for containing paper of a variety of size. Paper from the paper feeding cassettes 41 and 42 is sent to a conveying belt 44 via a resist roller 43, and is further sent in a direction toward the transfer unit 26Y. The conveying belt 44 conveys paper by moving in a circulating manner by rotation of rollers 45 and 46. The resist roller 43 and the conveying belt 44 constitute a paper conveying member.

Paper is first conveyed to the process unit 21Y, and then sent to the process units 21M, 21C, and 21K sequentially, so that an image of each color is formed. Description of image forming processing of black will be described below. A front surface of the photoconductive drum 22K is entirely electrified by the electric charger 23K, and then exposed by a laser beam output from the exposure unit 16 to form an electrostatic latent image. The electrostatic latent image formed on the photoconductive drum 22K is developed by the developing unit 24K and a toner image of black is formed on the photoconductive drum 22K. The toner image is transferred by the transfer unit 26K to from a black image on paper. Waste toner remaining on the front surface of the photoconductive drum 22K after the transfer is removed by the cleaner 25K.

Paper which has a color image formed thereon is conveyed to a fixing unit 30. The fixing unit 30 includes a heat member 31 and a pressing member 32, and fixes the toner on the paper. Then, the paper which passed through the fixing unit 30 is discharged via a paper discharging unit 47.

A stepping motor is used for rotational drive of the photoconductive drums 22K, 22C, 22M, and 22Y used in the image forming processing and rotational drive of the resist roller 43, etc. used for the paper conveyance. In particular, when a color image is formed, paper passes through four sets of process units 21K, 21C, 21M, and 21Y of black, cyan, magenta, and yellow. Therefore, conveyance and positioning of the paper is important. In order to carry out accurate image forming processing, the stepping motor is suitable.

In addition, in an image forming device of an intermediate transfer belt system, the stepping motor may be used for drive of an intermediate transfer belt. When there are a plurality of the stepping motors to be controlled, a plurality of control devices are provided in order to control each of the stepping motors. In addition, the control devices of the stepping motors are provided with a timer individually.

In the image forming device using the intermediate transfer belt, a toner image on the photoconductive drum is primarily transferred to the intermediate transfer belt. Further, a secondary transfer roller is arranged to face the intermediate transfer belt so that the toner image on the intermediate transfer belt is secondarily transferred to paper.

In the image forming device of the intermediate transfer belt system, the photoconductive drum and the intermediate transfer belt constitute an image carrier. The secondary transfer roller constitutes a transfer member.

FIG. 2 shows a block diagram of the control device for the stepping motor according to an embodiment of the present invention. In the present embodiment, control from activation to stoppage of the stepping motor is classified into a plurality of basic control items, and a plurality of modules for executing processing with respect to each of the control items are included. The present embodiment has a feature that the order of execution in each of the modules is specified in advance, and processing is executed sequentially to control rotation of the stepping motor.

The control of the stepping motor can be classified and summarized into the following five basic control items:

1. Activation wait control;
2. One-shot control;
3. Table reference control;
4. Continuous output control; and
5. Termination (off) control.

Specific contents of hardware processing with respect to the above five basic control items will be described later. A plurality of modules 51 to 55 in FIG. 2 constitutes an executing means for executing the five items of hardware processing. In addition, a sequencer 56 for optionally setting the executing order of the processing in the modules 51 to 55 is included.

The module 51 is connected with a register group 61. The module 52 is connected with register groups 621 and 622 via a selector 57. In addition, the module 53 is connected with register groups 631 and 632 via a selector 58. The module 54 is connected with register groups 641 and 642 via a selector 59.

In the description below, the register groups 621 and 622, the register groups 631 and 632, and the register groups 641 and 642 may be collectively referred to and described as register groups 62, 63, and 64, respectively.

Each of the register groups 61 to 64 constitutes a data storage unit or a data storage means to store setting data for controlling a state of the stepping motor, for example, a variety of data such as a current value. Each of the modules 51 to 54 reads out the setting data stored in one of the register groups 61 to 64 corresponding thereto, and executes a variety of types of processing based on the read out setting data.

Each of the modules 51 to 54 is connected with a register group 65 for common setting. Further, the register group 65 is connected to a prescaler 66. Output of the prescaler 66 is supplied to the modules 51 to 54. The prescaler 66 has a function as a timer, and frequency divides an output signal of an oscillator to generate a clock. The register group 65 sets a cycle, etc., of the frequency divided clock.

The sequencer 56 is connected with a register 67 for allocating the module. The register 67 allocates the modules so that processing is executed sequentially.

The sequencer 56 carries out switching over of the selectors 57 to 59, and also supplies an execution permission signal to each of the modules 51 to 55 via a signal line 60. The modules 51 to 55 which receive the execution permission signal execute processing. Therefore, the sequencer 56 constitutes a module control unit or a control means for specifying the order of execution of processing in the modules 51 to 55 in advance.

In addition, an execution complete signal is supplied to the sequencer 56 from the modules 51 to 55. Further, the module 54 is connected with a memory (RAM) 69 via a RAM controller 68.

Output of the modules 51 to 55 is selectively supplied to a waveform generating unit 71 via a selector 70, and, at the same time, selectively supplied to a current control unit 73 via a selector 72. The selectors 70 and 72 are controlled by an executing module selecting signal from the sequencer 56, and output of any of the modules 51 to 55 is selected.

The waveform generating unit 71 is connected with a register 74 for output setting. The waveform generating unit 71 carries out setting of an output waveform by the register 74. Output of the waveform generating unit 71 and the current control unit 73 is supplied to a stepping motor 75. Rotation of the stepping motor 75 is controlled in accordance with an excitation pattern.

Figure 3A:
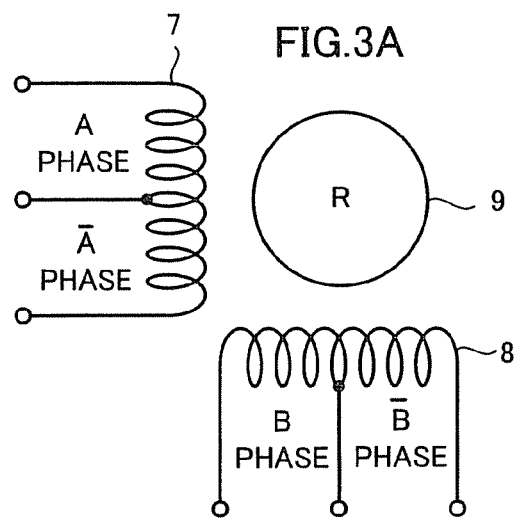
FIGS. 3A and 3B are explanatory views showing an example of a schematic configuration diagram of the stepping motor and an excitation pattern.

FIG. 3A shows a simplified configuration diagram of the stepping motor 75 which is configured with stator windings 7 and 8 and a rotor 9. Current is supplied to the stator windings 7 and 8 in accordance with the excitation pattern so that the rotor 9 is rotated.

Figure 3B:
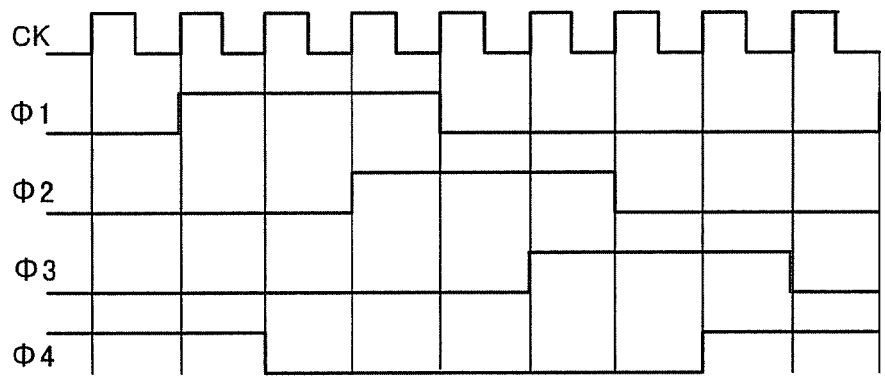

FIG. 3B shows an example of the excitation pattern. FIG. 3B shows an example of 1-2 phase excitation. CK denotes a clock, Φ1 denotes A phase excitation pattern, Φ2 denotes B phase excitation pattern, Φ3 denotes −A phase excitation pattern, and Φ4 denotes −B phase excitation pattern.

The clock CK is generated based on a reference timing signal generated in the timer. A phase state of each of the excitation patterns is determined by the clock CK. Therefore, a cycle of the clock can be changed by optionally setting a cycle of the timing signal from the timer (hereinafter, referred to as "timer cycle") Thereby, a rotational speed of the stepping motor 75 can be controlled. When the timer cycle is made shorter, the stepping motor 75 rotates at high speed. When the timer cycle is made longer, the stepping motor 75 rotates at low speed.

Figure 4:
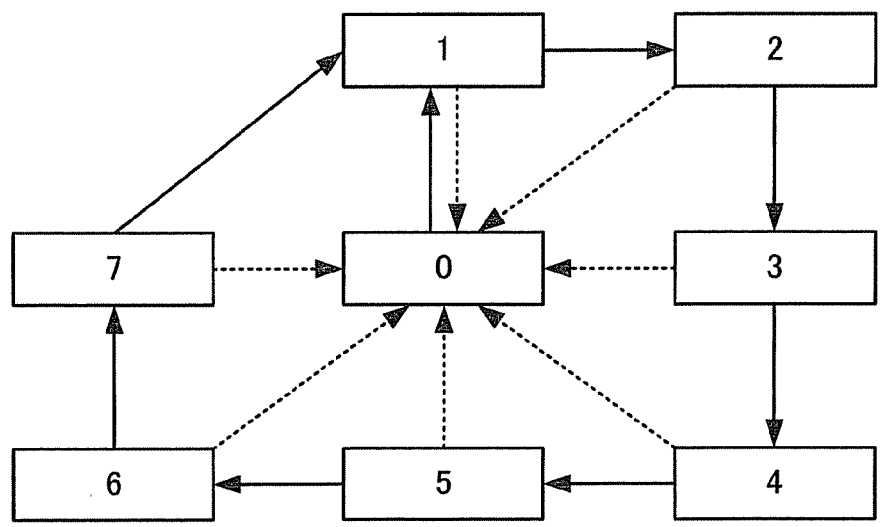
FIG. 4 is an explanatory view for explaining an operational sequence of the control device for the stepping motor according to the embodiment of the present invention.

FIG. 4 is an explanatory view for schematically explaining operating steps of the stepping motor control device according to the present embodiment. The sequencer 56 builds a plurality of sequences, for example, a ring sequence including a sequence 0 to a sequence 7 as shown in FIG. 4. The sequencer 56 allocates processing of each of the modules 51 to 55 for each of the sequences. Transition among the sequences is made such that the processing is executed in the order set in advance.

The sequencer 56 starts from the sequence 0 as a starting point, then transition is made in the order of the sequence 1, the sequence 2, the sequence 3, . . . the sequence 7 and the sequence 1, and the processing progresses in this order. When sequence disable setting, for example a sequence termination condition such as interruption, is set in the middle of the processing, the processing is terminated (rotation of the motor is stopped) at this stage, and the processing returns to the sequence 0.

In addition, the processing starts from the sequence 0 again by a sequence enable setting. For example, the activation wait module 51 is set in the sequence 0 in FIG. 4, and any one of the modules 52 to 55 is optionally set in the sequences 1 to 7.

As described above, the control of the stepping motor can be classified into 1) activation wait control, 2) one-shot control, 3) table reference control, 4) continuous output control, and 5) termination control. The plurality of modules 51 to 55 are for executing the five items of the hardware processing in the order set by the sequencer 56. Thereby, the motor control with a high degree of freedom can be made possible.

Here, a processing function of each of the modules 51 to 55 will be described. The modules 51 to 54 execute processing based on the setting data stored in the register groups 61 to 64.

The activation wait module 51 is a module for making transition to a next sequence at the time an activation factor is generated. In the register group 61, what is selected as the activation factor is set. In addition, when a motor holding current is flown while waiting for activation, the register group 61 includes a current value of the motor holding current as a variable. At the time the stepping motor is controlled, the activation wait module 51 is used as an off state or a constant hold state, and is fixed to the sequence 0 in the present embodiment. When the selected activation factor meets the condition in the waiting state, the processing moves to the next sequence 1.

As the sequence termination condition in this case, the sequence can be terminated by operation of the register by the CPU of an image forming device main body and generation of an external interruption signal and an internal interruption signal, etc. One or more optional conditions can be selected from these conditions. The external interruption signal can be delayed for an optional period of time from an actual change of the signal. The internal interruption signal is generated when a timer count value of another timer reaches to a specified value which was set separately.

The one-shot control module 52 is a module for making transition to the next sequence after counting for a specified period of time. After the set count value is counted, the module stops the processing and moves to the next sequence. The register groups 621 and 622 include the count value for the period of time to be counted, and a motor holding current value while this control is executed, etc. as a variable. When the stepping motor is controlled, the module 52 is utilized to carry out pre-hold and post-hold controls.

That is, since a phase state of the motor is not known immediately after power is turned on, the stepping motor 75 can reach to a drive starting position by outputting a predetermined signal and holding it for a certain period of time. This period of time is the pre-hold period. In addition, since the motor rotates due to inertia when the motor is stopped, a predetermined period of time until a minute vibration of the motor disappears is set. This period of time is the post-hold period. In addition, phase switch over can be selected when execution of the processing is started/terminated. In addition, the module 52 functions as a one-shot output circuit depending on the register setting and sequencer setting.

The continuous output module 53 is a module for switching the output for each set period of time. In the register groups 631 and 632, a period of time to be counted and a motor drive current value while the control is executed are set as variables, and also a termination condition of executing processing of the continuous output module (sequence termination condition), etc. is set. In the module 53, a count up signal is generated for each of the count values for a set period of time. When the termination condition of the execution is met, the module is stopped and the processing moves to the next sequence. The module is used as a constant speed drive module when the stepping motor is controlled.

As the sequence termination condition in this case, the sequence can be terminated by operation of the register by the CPU of the image forming device main body and generation of an external interruption signal and an internal interruption signal, etc. One or more optional conditions can be selected from these conditions. The external interruption signal can be delayed for an optional period of time from an actual change of the signal. The internal interruption signal is generated when a timer count value of an optional timer including itself reaches to a specified value which was set separately. Also, the interruption signal is generated when a sequencer of an optional timer among timers including itself is moved to a sequence.

The table reference controlling module 54 reads out data from an address of the RAM 69 and carries out counting with the data as a count value. After the counting is terminated, the module 54 outputs the count up signal and reads out data of the next address to similarly carry out the counting. This operation is repeated for the set number of address regions, and then the processing by the module 54 is terminated and the processing moves to the next sequence. The module 54 is used for slow-up and slow-down controls when the stepping motor is controlled.

At the time of the slow-up, the number of rotation is gradually increased by shortening a timer cycle for each step. When reaching the predetermined number of steps, the processing moves to the next sequence (constant speed processing). At the time of the slow-down, the number of rotation is gradually decreased by making the timer cycle longer for each step. When reaching the predetermined number of steps, the processing moves to the next sequence (stopping processing). At the time when the motor is stopped and if the motor is stopped abruptly, the phase state is disordered and a fault such as step-out may occur. Therefore, the slow-down control is carried out.

In the register groups 641 and 642, a RAM reference starting address, a RAM reference ending address, an address counter addition/subtraction setting, and the motor drive current value while the control is executed are set as variables. The RAM 69 has influence on CPU processing when readout is carried out via a system bus. Therefore, an exclusive RAM (if a table is definite, a ROM can be used) having a small capacity is desirably prepared.

In addition, the table reference module 54 can be made to function as a circuit for continuously outputting a variable duty signal, depending on setting of the registers 641 and 642 and setting of the sequencer 56.

The off sequence module 55 is a module for forcibly making transition to the sequence 0, and returns the processing to the sequence 0 of the activation wait sequence.

The count up signal described above is a one-shot pulse output generated for each time of count up. At the time the count up signal is generated, there are cases where one edge of the clock is or both edges of the clock are detected. In the case of the one edge detection, the count up signal can be generated with a half value of the setting value of the timer. Whether the one edge detection or the both edge detection is adopted is determined by the setting item of the register group 65.

The ring sequencer has the sequence 0 as the starting point, and makes transition of the sequences when the transition condition specific to each of the modules is met. At termination or start of each of the sequences, the ring sequencer generates an interruption for each of the sequences.

The modules 51 to 55 can achieve a minimum function if there is one for each of the modules. However, in an actual operation, there is a case where resetting of the sequence and a change of parameters of the module are requested during one series of operation from activation of the motor throughout the stopping thereof. For this reason, with respect to the one-shot module 52, the continuous output module 53, and the table reference module 54, two types of parameters are desirably prepared for each variable so that the variables can be selected. Therefore, two sets of the setting register groups 62 to 64 are provided.

The registers 61 to 64 can be replaced by a memory. In this case, the memory only need to have a plurality of storage regions which can store a variety of types of setting data.

Figure 5:
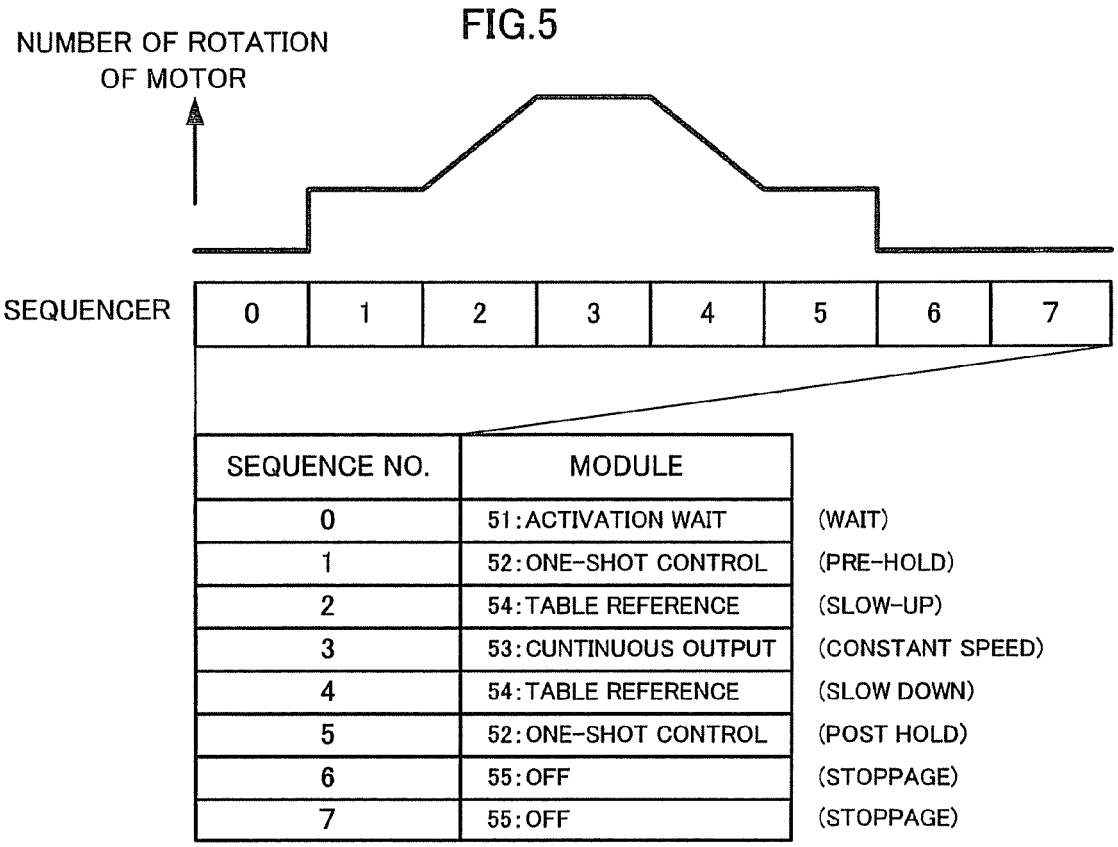
FIG. 5 is an explanatory view for explaining a setting example of a ring sequence of the control device for the stepping motor according to the embodiment of the present invention.

FIG. 5 is a view for explaining a setting example of the ring sequence by the sequencer 56 and shows a case where basic acceleration and deceleration control of the stepping motor is carried out. In FIG. 5, any of the modules 51 to 55 is set with respect to the sequences 0 to 7, and the processing in the modules 51 to 55 is executed sequentially.

FIG. 5 shows control steps from activation of the motor to acceleration, constant speed, deceleration, and stoppage. In the sequence 0, the activation wait module 51 is set, and the stepping motor 75 is in a state of waiting. In the next sequence 1, the one-shot module 52 is set, and the stepping motor 75 is in the period of the pre-hold. In addition, in the sequence 2, the table reference module 54 is set and the stepping motor 75 is controlled for the slow-up and in a state where the rotational speed gradually increases.

Further, in the sequence 3, the continuous output module 53 is set, and the stepping motor 75 is in a state of being controlled at the constant speed. In the sequence 4, the table reference module 54 is set, and the stepping motor 75 is controlled for the slow-down, and the rotational speed thereof gradually decreases.

In the sequence 5, the one-shot module 52 is set, and the stepping motor 75 is in the period of the post-hold. Then, in the sequences 6 and 7, the off control module 55 is set, and the stepping motor 75 is stopped.

As described above, the sequencer 56 builds the ring sequence in advance. Also, by setting the optional processing modules 51 to 55 in each of the sequences, optional control can be executed.

Figure 6:
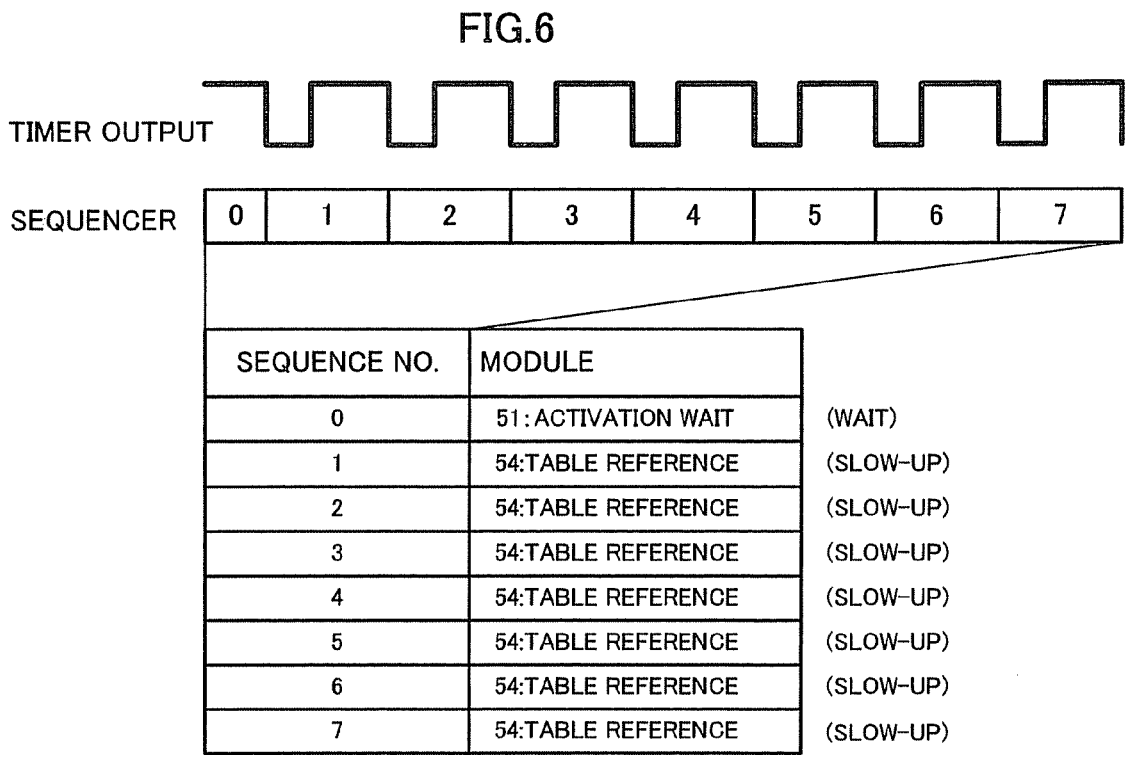
FIG. 6 is an explanatory view for explaining a setting example of a ring sequence of a sequence control device according to the embodiment of the present invention.

FIG. 6 is a view for explaining operation of the sequence control device according to an embodiment of the present invention. FIG. 6 shows an example of generating the timing signal having an optional duty as time output. In the sequence 0, the activation wait module 51 is set. In addition, in step 2 and the following steps, the table reference module 54 is continuously set. In this case, the table reference module 54 refers to a period of time to be counted as the timer from RAM 69. When the counting is carried out for the period of time, the module 54 reads out the next period of time to be counted, and similar processing is repeated.

Therefore, the timing signal having a duty with a predetermined ratio of a high "H" period and a low "L" period can be continuously obtained as the timer output. However, the timer output is in an endless loop in this state. Therefore, a register for resetting is provided in the register group 64 so that the loop can be stopped.

In the case of FIG. 6, most of the settings are terminated before the start of the timer output. Therefore, there is no specific need for setting by firmware, except that the register for stopping after the sequencer starts operation.

Next, a case in which control exceeding the number of the sequences set by the sequencer 56 in advance is carried out will be described with reference to FIGS. 7A to 7C.

Figure 7A:
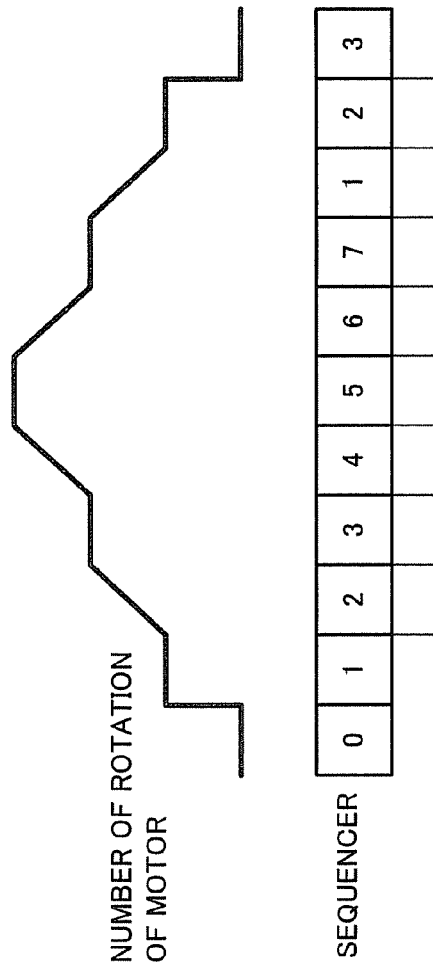
FIGS. 7A, 7B, and 7C are explanatory views for explaining resetting of a sequence of the control device for the stepping motor according to the embodiment of the present invention.

FIG. 7A shows another example of the acceleration and deceleration control of the stepping motor. In initial setting, wait, pre-hold, slow-up, constant speed, slow-up, constant speed, slow-down, and constant speed, are set by the sequences 0 to 7.

Figure 7B:
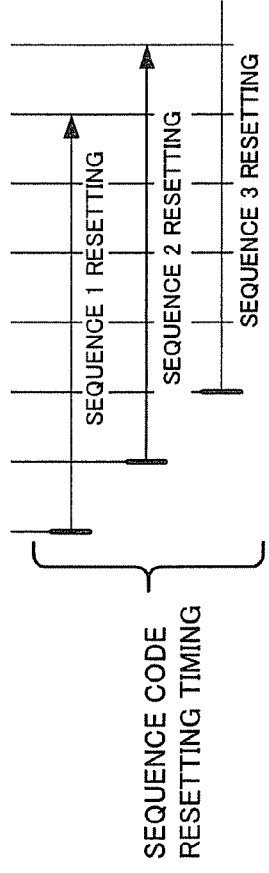

FIG. 7B shows a case in which interruption is output by the register 67, and resetting is carried out with respect to the sequences 1, 2 and 3 following the sequences 0 to 7 in the initial setting. The sequence 1 in the initial setting is the pre-hold processing. However, the next sequence 1 in FIG. 7B is reset to the slow-down processing. In this case, after the processing in the sequence 1 in the initial state is terminated, the resetting is made to be completed before processing in the next new sequence 1 starts.

Similarly, the sequence 2 in the initial setting is the slow-up processing. However, the next sequence 2 is reset to the post-hold. In addition, the sequence 3 in the initial setting is constant speed processing. However, the next sequence 3 is set to the off control again. In any case, in the case of the resetting, the resetting needs to be completed after the processing in the sequence of the initial setting and before processing in the next new sequence starts.

In addition, as for the resetting, not only a sequence code but also a parameter of the modules 51 to 54 can be reset and modified.

Figure 7C:
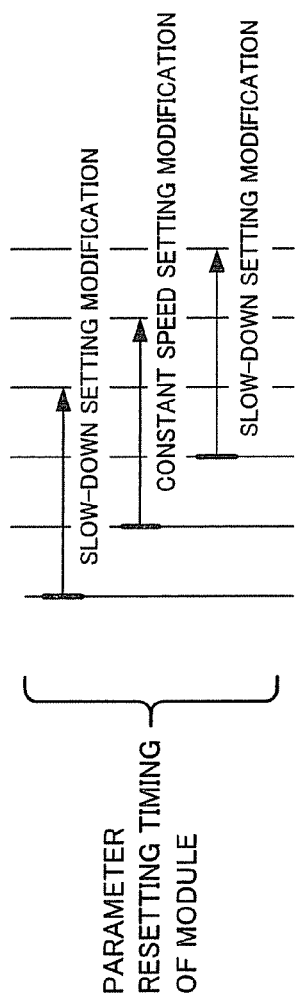

For example, as shown in FIG. 7C, a case in which a parameter of the slow-down of the sequence 6 in the initial setting is modified will be described. The table reference module 54 executes control of the slow-down and the slow-up. Therefore, after the slow-up control of the sequence 2 is terminated, the parameter of the slow-down of the sequence 6 is modified, and the modification is made to be completed before processing in the new sequence 6 starts.

In addition, when a parameter of the constant speed control of the sequence 7 is modified, the modification is made to be carried out after processing of the constant speed control in the sequence 3 is completed. Further, when modifying a parameter of the slow-down control of the next sequence 1, the modification is carried out after processing of the slow-up control by the sequence 4 in the initial setting is completed.

In the case of FIG. 7C as well, when setting is modified, the parameter needs to be modified after processing in the sequence set initially is completed, and before the processing is executed in the new sequence.

As for setting of a current value in each of the modules, although the current value is not a required variable, the current value can be changed on a sequence basis in an actual operation. For example, energy in a case of shifting from a stoppage state to a rotating state of the motor is different from energy at the time of constant speed. Therefore, by setting the current value for each of the modules, a drive amount of the motor can be appropriately adjusted.

As items of the setting data by each of the registers, the following setting items can be considered:

Register 74 for Output Setting:
Phase signal, Switching signal of timer output, Clock, Enable, Reset signal, Rotational direction signal, Excitation pattern (1-2 phase, 2 phase, etc.)

Register 61 for Activation Waiting:
Activation condition, External activation signal valid/invalid, External activation signal allocation, Internal interruption signal valid/invalid, Internal activation factor allocation, Register activation valid/invalid, Current setting, etc.

Register 65 for Common Setting:
Prescaler cycle setting, One edge/both edge output setting (at the time of clock selecting)

Registers 621 and 622 for One-Shot Control:
Pre-hold, Post-hold, One-shot switching signal, Timer cycle setting, Current setting Registers 631 and 632 for Continuous Output:
Timer cycle setting, Speed change condition setting, External speed change signal valid/invalid, External speed change signal allocation, Internal interruption signal valid/invalid, Internal speed change factor allocation, Register speed change valid/invalid, Phase correction valid/invalid, Current setting Registers 641 and 642 for Table Reference:
Reference table starting address setting, Reference table ending address setting, Reference ascending order/descending order setting, Current setting Register 67 for Module Allocation:
Sequence 1 module allocation setting, Sequence 2 module allocation setting, Sequence 3 module allocation setting, Sequence 4 module allocation setting, Sequence 5 module allocation setting, Sequence 6 module allocation setting, Sequence 7 module allocation setting In the embodiment of FIG. 2, an example where output of the register groups 621 and 622 is selected by the selector 57 is described. A configuration in which the register groups 621 and 622 are configured as one register and the selector 57 is omitted can be adopted.

For example, the configuration may be one that an intermediate buffer is arranged between one register and the module 52. In addition, the setting data stored in the register is read into the intermediate buffer. The module 52 executes the processing in accordance with the read out setting data.

Then, by writing new setting data in the register, the intermediate buffer reads out the next new setting data from the register at the time the corresponding module starts execution of processing. The module 52 executes the processing in accordance with the new setting data. In this manner, the selector 57 can be omitted.

As to the register groups 631 and 632 and the selector 58, and the register groups 641 and 642 and the selector 59 as well, a configuration in which a single register and an intermediate buffer are provided in a similar manner can be adopted.

As described above, according to the embodiment of the present invention, the control from the activation to the stoppage of the stepping motor is classified into basic control items. The processing with respect to the basic control items is allocated in a plurality of the modules and executed, and necessary variables and the order of execution of modules is set in advance, thereby the stepping motor can be controlled. In this manner, dependency on firmware processing can be reduced. Further, the variables to be set are focused to be minimum, therefore the firmware processing can be simplified.

In particular, in the control of the stepping motor, a wide variety of applications are possible by responding to high speed control, etc. of the motor and optionally carrying out combination of the sequences. In addition, processing necessary for the motor control, etc. is divided into five modules. Thereby, different control can be performed only by changing of a variable, and commonality and simplification of a circuit can be attempted.

Further, at the switching of the sequence, as for the module which usage, such as the table reference processing, the one shot processing, and the termination processing is determined in advance, there is no need for operation for making transition while being operated by fixing the transition condition of the sequence. In this manner, control management processing by the CPU can be reduced. In addition, at the switching of the sequence, a condition of transition from the activation processing and the continuous output processing is able to be optionally selected from the register operation by the CPU, an external input, and the internal interruption. Thereby, the degree of freedom becomes high, and a load of the CPU can be reduced.

In the above description, the control of the stepping motor and the timer output control are described as examples. However, an application range of the present invention is wide, and a variety of modifications are possible in a range not deviating from the scope of claims.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A control device for a stepping motor comprising:
    a data storage unit that stores setting data for controlling a state of the stepping motor for each of a plurality of basic control items obtained by classifying control from activation to stoppage of the stepping motor;
    a plurality of modules that execute processing with respect to the basic control items based on the setting data stored in the data storage unit; and
    a module control unit that specifies the order of executing the processing by the plurality of modules,
    wherein the stepping motor is controlled by operating the modules in accordance with the order of execution specified by the module control unit, and the setting data of the modules are reset and modified before the processing is executed in a new sequence during rotation of the stepping motor.

2. The control device for the stepping motor according to claim 1, wherein
    the module control unit includes a sequencer which makes the processing by an optional module among the plurality of modules sequentially executed in the order specified in advance.

3. The control device for the stepping motor according to claim 2, wherein
    the sequencer proceeds the processing by making transition to a next sequence when the processing starts from a sequence of a starting point and processing in a current sequence is executed, and controls the plurality of modules so as to make transition to the sequence of the starting point to terminate the processing when a termination condition is set in the middle of the processing.

4. The control device for the stepping motor according to claim 2, wherein
    the sequencer is configured such that a condition for making transition to a next sequence can be selected from a plurality of conditions as to an optional processing module among the plurality of modules.

5. The control device for the stepping motor according to claim 1, wherein
    the basic control items include five kinds of processings; activation wait processing, one shot processing, table reference processing, continuous output processing, and termination processing, and
    the data storage unit stores a plurality of items of setting data with respect to the five kinds of processings, and the plurality of modules can execute each of the five types of the processings.

6. The control device for the stepping motor according to claim 5, wherein
    the data storage unit has at least two independent storage regions in order to store a plurality of items of setting data with respect to the one shot processing, the table reference processing, and the continuous output processing.

7. The control device for the stepping motor according to claim 5, wherein
    the module that executes the one shot processing among the plurality of modules carries out processing of a pre-hold period before the stepping motor starts rotation, or a post-hold period before the stepping motor stops the rotation.

8. The control device for the stepping motor according to claim 5, wherein
    the module that executes the table reference processing among the plurality of modules carries out processing of a slow-up period until the stepping motor reaches to a constant speed rotation and processing of a slow-down period before the stepping motor moves from the constant speed rotation to a stoppage state by being connected to a memory and sequentially reading out and processing data in a predetermined address region of the memory.

9. The control device for the stepping motor according to claim 5, wherein
    the module that executes the continuous output processing among the plurality of modules carries out constant rotation processing of the stepping motor.

10. A control device for a stepping motor comprising:
    data storage means for storing setting data for controlling a state of the stepping motor for each of a plurality of basic control items obtained by classifying control from activation to stoppage of the stepping motor;
    plurality of executing means for executing processing with respect to the basic control items based on the setting data stored in the data storage means; and
    control means for specifying the order of executing the processing by the plurality of executing means,
    wherein the stepping motor is controlled by operating the executing means in accordance with the order of execution specified by the control means, and the setting data of plurality of executing means are reset and modified before the processing is executed in a new sequence during rotation of the stepping motor.

11. The control device for the stepping motor according to claim 10, wherein
    the control means makes processing by optional executing means among the plurality of executing means sequentially executed in the order specified in advance, and proceeds the processing by making transition to a next sequence when the processing in a current sequence is executed, and
    controls the plurality of executing means such that the processing is terminated by making transition to a sequence of a stating point when a termination condition is set in the middle of the processing.

12. The control device for the stepping motor according to claim 10, wherein
the basic control items include five kinds of processings of an activation wait processing, a one-shot processing, a table reference processing, a continuous output processing, and a termination processing, and
the data storage means stores a plurality of items of setting data with respect to the five kinds of processings, and the plurality of executing means are configured such that each of the five types of the processings is made possible to be executed.

13. A control method of a stepping motor comprising:
classifying control from activation to stoppage of a stepping motor into a plurality of basic control items;
including a plurality of modules capable of executing a plurality of kinds of processing with respect to the basic control items;
storing setting data for controlling a state of the stepping motor for each of the basic control items in a data storage unit;
specifying the order of executing the processing by the plurality of modules;
reading out the setting data stored in the data storage unit in accordance with the specified executing order;
sequentially operating the plurality of modules based on the readout setting data to control the stepping motor; and
modifying the setting data of the modules before the processing is executed in a new sequence during rotation of the stepping motor.

14. The control method of the stepping motor according to claim 13, wherein
the processing by the plurality of modules is sequentially executed in the order specified in advance;
the processing progresses by making transition to a next sequence when the processing in a current sequence is executed; and
terminating the processing by making transition to the sequence of a starting point when a termination condition is set in the middle of the processing.

15. An image forming device comprising:
an image forming unit that forms an image in an image carrier;
a transferring member that transfers an image formed in the image carrier to paper;
a paper conveying member that conveys the paper to the image forming unit;
a stepping motor that drives at least one of the image forming unit, the transferring member, and the paper conveying member;
a data storage unit that stores setting data for controlling a state of the stepping motor for each of a plurality of basic control items obtained by classifying control from activation to stoppage of the stepping motor;
a plurality of modules that execute processing with respect to the basic control items based on the setting data stored in the data storage unit; and
a module control unit that specifies the order of executing processing in the plurality of modules,
wherein the stepping motor is controlled by operating the module in accordance with the executing order specified by the module control unit, and the setting data of the modules are reset and modified before the processing is executed in a new sequence during rotation of the stepping motor.

16. The image forming device according to claim 15, wherein
the image carrier of the image forming unit is configured with a photoconductive drum or an intermediate transfer belt, and uses the stepping motor that drives the photoconductive drum or the intermediate transfer belt.

17. The image forming device according to claim 15, wherein
the image forming unit has a process unit for forming an image on the conveyed paper, and the process unit is mountable to and removable from a main body of the image forming device.

18. A sequence control device comprising:
a data storage unit that stores setting data for each of a plurality of basic control items obtained by classifying control from activation processing to stoppage processing;
a plurality of modules that execute processing with respect to the basic control items based on the setting data stored in the data storage unit; and
a sequencer that makes processing by an optional module among the plurality of modules in the order specified sequentially,
wherein the setting data of the modules are reset and modified after processing in the sequence set initially is completed, and before the processing is executed in a new sequence.

19. The sequence control device according to claim 18, wherein
the sequencer proceeds the processing by making transition to a next sequence when the processing starts from a sequence of a starting point and processing in a current sequence is executed, and controls the plurality of modules so as to make transition to the sequence of the starting point to terminate the processing when a termination condition is set in the middle of the processing.

20. The sequence control device according to claim 18, wherein
one of the plurality of modules includes a table reference module for being coupled with a memory and sequentially reading out and processing data in a predetermined address region of the memory, and
the sequencer builds sequences so as to continuously repeat processings by the table reference module, thereby a timing signal in which an optional duty is set is continuously generated.

* * * * *